US008150971B2

(12) United States Patent
Lublin et al.

(10) Patent No.: US 8,150,971 B2
(45) Date of Patent: Apr. 3, 2012

(54) MECHANISM FOR MIGRATION OF CLIENT-SIDE VIRTUAL MACHINE SYSTEM RESOURCES

(75) Inventors: Uri Lublin, Raanana (IL); Rami Tamir, Even Yehuda (IL); Yaniv Kamay, Modi' (IL)

(73) Assignee: Red Hat Israel, Ltd., Raanana (IL)

( * ) Notice: Subject to any disclaimer, the term of this patent is extended or adjusted under 35 U.S.C. 154(b) by 244 days.

(21) Appl. No.: 12/475,538

(22) Filed: May 31, 2009

(65) Prior Publication Data

US 2010/0306381 A1    Dec. 2, 2010

(51) Int. Cl.
*G06F 15/173* (2006.01)
(52) U.S. Cl. ............ 709/226; 709/227; 718/1; 718/104; 718/106
(58) Field of Classification Search .................. 709/226, 709/227; 718/1, 104, 106
See application file for complete search history.

(56) References Cited

U.S. PATENT DOCUMENTS

| | | | | |
|---|---|---|---|---|
| 7,065,549 | B2 * | 6/2006 | Sun et al. ....................... | 709/201 |
| 2007/0079307 | A1 * | 4/2007 | Dhawan et al. .................... | 718/1 |
| 2007/0180436 | A1 * | 8/2007 | Travostino et al. ........... | 717/138 |
| 2008/0059556 | A1 * | 3/2008 | Greenspan et al. ........... | 709/201 |
| 2008/0189432 | A1 * | 8/2008 | Abali et al. ................... | 709/238 |
| 2009/0157882 | A1 * | 6/2009 | Kashyap ....................... | 709/227 |
| 2009/0240790 | A1 * | 9/2009 | Utsunomiya et al. ......... | 709/221 |
| 2010/0042636 | A1 * | 2/2010 | Lu ................................. | 707/100 |
| 2010/0094948 | A1 * | 4/2010 | Ganesh et al. ................. | 709/212 |
| 2010/0169494 | A1 * | 7/2010 | Machulsky et al. ........... | 709/227 |

OTHER PUBLICATIONS

Prior, Sam; "Xen Virtual Machine Migration" Jun. 27, 2008; accessed <http://www.novell.com/communities/node/5050/xen-virtual-machine-migration>.*
Qumranet, Solid ICE™, Connection Broker, Apr. 2008, 7 pages.
Qumranet, KVM-Kernel-based Virtualization Machine, White Paper, 2006, 5 pages.
Qumranet, Solid ICE™, Overview, Apr. 2008, 15 pages.
Qumranet, Solid ICE™, Provisioning Manager, Apr. 2008, 5 pages.
Qumranet, Solid ICE™, Virtual Desktop Server (VDS), Apr. 2008, 6 pages.
Clark, Christopher, et al., "Live Migration of Virtual Machines," Proceedings of the $2^{nd}$ USENIX Symposium on Networked Systems Design and Implementation, 2005, 14 pages.
Qumranet, "KVM: migrating a VM," Migration-Kernel based Virtual Machine, http://kvm.qumranet.com/kvmwiki/Migration, 5 pages, 2006.
Lublin, Uri, et al., "Qumranet, KVM: Live Migration," 28 pages, 2007.

* cited by examiner

*Primary Examiner* — Thomas Dailey
(74) *Attorney, Agent, or Firm* — Lowestein Sandler PC

(57) ABSTRACT

In one embodiment, a mechanism for migration of client-side virtual machine system resources is disclosed. In one embodiment, a method includes receiving notification that a virtual machine (VM) is to be live migrated from a first server to a second server, connecting one or more client resources associated with the VM to the second server during the live migration of the VM while maintaining a simultaneous active VM connection of the one or more client resources to the first server, and disconnecting the active VM connection of the one or more client resources to the first server when the live migration of the VM is complete.

17 Claims, 5 Drawing Sheets

MECHANISM FOR MIGRATION OF CLIENT-SIDE VIRTUAL MACHINE SYSTEM RESOURCES

TECHNICAL FIELD

The embodiments of the invention relate generally to virtual machine systems and, more specifically, relate to migration of client-side virtual machine system resources.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices.

Often times, a VM that is centrally hosted may require migration for a variety of reasons, including load balancing on the host server, maintenance of the host server, upgrades of software and/or hardware of the host server, and so on. Presently, solutions are offered for live migration of VMs that provide almost unnoticeable VM downtime to the end user of the VM. Yet, one problem that arises with current implementations of live migration of VMs is that they do not address how to live migrate the client-side resources associated with the VM, such as client-side agents used for remote rendering and connection protocols and other resources associated with the VM (such as a display, input devices (mouse, keyboard), USB devices, and storage devices).

Under current solutions, migration of these client resources is time-consuming and inefficient, as well as a significant interruption to the end user of the VM. As such, a solution for migration of VM client-side resources, with minimal interruption to the end user of the VM, would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1A:
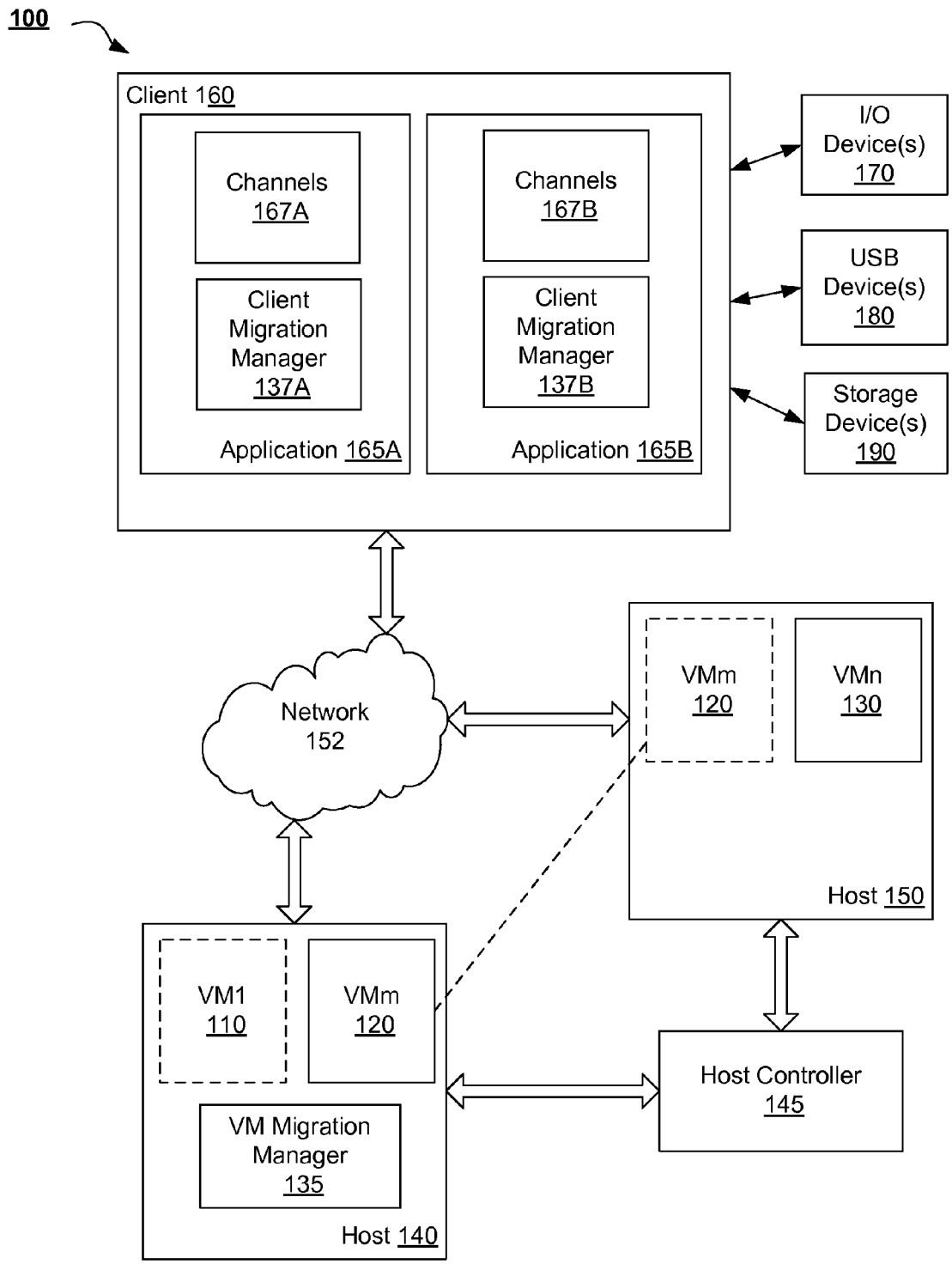
FIG. 1A is a block diagram of a virtualization system for live migration of client resources according to some embodiments of the invention.

Embodiments of the invention provide for a mechanism for migration of client-side virtual machine system resources. In one embodiment, a client receives a notification that a virtual machine (VM) is to be live migrated from a first server to a second server. In response, the client invokes a client migration manger that connects one or more client-side resources associated with the remote VM to the second server using corresponding channels. The client migration manger connects the client-side resources to the second server while maintaining a simultaneous active VM connection of the client-side resources to the first server. When the live migration of the remote VM is completed, the client migration manger causes the second server to become an active server, and then causes the active VM connection of the client-side resources to the first server to be disconnected.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide for a mechanism for migration of client-side virtual machine system resources. Embodiments of the invention connect client-side resources associated with a virtual machine (VM) to a destination host server as an early step in the process of live VM migration. Under prior live migration schemes, migration of client-side resources for the VM interrupts the VM service provided to the end user of the VM. Embodiments of the invention allow the switch to the active destination host to be done very quickly and transparently (or with minimal interruption) to the end user of the VM.

FIG. 1A is a block diagram of a virtualization system 100 in which VMs and their associated client-side resources are live migrated according to some embodiments of the invention. Referring to FIG. 1A, system 100 includes, but is not limited to, one or more clients 160 communicatively coupled to remote servers 140, 150 or a cluster of servers 140, 150 over a network 152. Network 152 may be a local area network (LAN) or a wide area network (WAN) and may be a combination of one or more networks. Each server is configured to host one or more virtual machines. The servers 140, 150 may be coupled to a host controller 145 (via a network or directly) that manages virtual machines hosted by servers 140, 150. The host controller 145 may add a virtual machine, delete a virtual machine, balance the load on the server cluster, provide directory service to the virtual machines, and perform other management functions.

Each virtual machine hosted by server 140 or 150 has one or more applications executed and hosted by a guest operating system (not shown) within the virtual machine. Multiple guest operating systems and the associated virtual machines may be controlled by another operating system (also referred to as a host OS). Typically, a host OS represents a virtual machine monitor (VMM) (also referred to as a hypervisor) for monitoring the hosted virtual machines. A guest OS may be of the same or different type with respect to the host OS. For example, a guest OS may be a Windows operating system from Microsoft and a host OS may be a Linux operating system available from Red Hat. In addition, the guest OSes running on the host 140, 150 can be of the same or different types.

Virtual machines can be, for example, hardware emulation, full virtualization, para-virtualization, and operating system-level virtualization virtual machines. Different virtual machines hosted by server 140, 150 may have the same or different privilege levels for accessing different resources.

In one embodiment, each virtual machine 110, 120 hosts or maintains a desktop environment providing virtual desktops for remote clients including client 160. A virtual desktop can represent an output (e.g., an image to be displayed) generated by a desktop application running within virtual machine 110 or 120. Graphics data associated with the virtual desktop can be captured and transmitted to a client such as client 160, where the virtual desktop may be rendered by a rendering agent and presented by a client application (e.g., application 165A or application 165B).

It should be noted that functionality provided to clients such as client 160 by virtual machines 110, 120 is not limited to virtual desktops and may include a wide variety of other server-based virtualization functions made available to the clients.

Each VM 110, 120 may communicate with one or more clients. For example, VM 120 may communicate with client 160 running one or more client applications 165A, 165B. Alternatively, each application 165A, 165B can communicate with different VMs. For instance, client application 165A may communicate with VM 110 and client application 165B may communicate with VM 120.

Each client application 165A, 165B may have one or more client-side resources. Client-side resources may include end user devices such as an input/output (I/O) device 170 (e.g., a display, a keyboard, a mouse), a USB device 180, or a storage device 190, etc. In one embodiment, VM 120 communicates with client application 165A using a multichannel protocol (e.g., Remote Desktop Protocol (RDP), Simple Protocol for Independent Computing Environments (SPICE™ from Red Hat, etc.) that allows for connection between VM 120 and end-user devices of the client application 165A via individual channels 167A. The VM 120 may include a virtual device for each end user device to allow VM access to control and management functions of the end user device.

In some embodiments, client-side resources also include a remote rendering agent and/or a remote connection protocol agent that are implemented to improve end-user experience of the virtual desktop system. In particular, a remote rendering agent and/or a remote connection protocol agent may work in tandem with the host server 140 and the VM 120 to determine the most efficient place to process graphics to maximize an end user experience and minimize system load. VM 120 may maintain connection with the remote rendering agent and/or the remote connection protocol agent via individual channels (some of channels 167A).

During the operation of VM 120, it may need to be live migrated from a current host 140 to a new host 150 for a variety of reasons, including load balancing on the host server, maintenance of the host server, upgrades of software and/or hardware of the host server, and so on. Live migration is the transfer of a VM from one host server to another host server, while the guest OS of the VM continues to run. Live migration provides minimal interruption and service downtime to the VM and its end user.

In the illustrated embodiment, each server including server 140, hosts a VM migration manager 135 that oversees a live migration process of its VMs. In one embodiment, a client migration manager 137A, 137B is located in each client application 165A, 165B to cooperate with the VM migration manager 135 during live migration of a corresponding VM. Alternatively, the client migration manager 137 can be an independent module external the client application 165A, 165B, and the client 160 can host a single client migration manager 137 for all client applications 165A, 165B, or multiple client migration managers 137A, 137B for individual client applications 165A, 165B.

When VM 120 is migrated between two hosts 140 and 150, the client application 165A associated with the VM 120 keeps running on the client 160. Under prior live migration schemes, client-side resources of the client application 165A still needed to connect to the VM 120 running on the destination host 150 after live migration. As a result, client-side resources for the VM 120 would have to wait for the VM migration to complete before disconnecting from the source host 140 and connecting to the destination host 150, resulting in significant downtime and performance impact for the end user of the VM 120.

Embodiments of the invention address the issues with prior art live migration solutions by connecting client-side resources of the client application 165A to the destination host 150 via channels 167A as an early step in the process of live migration of the VM 120. The switch of the active channels 167A to the destination host 150 is done upon successful completion of the VM migration, and very quickly and transparently to the end user of the VM 120. During migration, in some embodiments, messages can be sent from host 140 to client 160, from host 150 to client 160, and from client 160 to host 140 and/or 150.

Figure 1B:
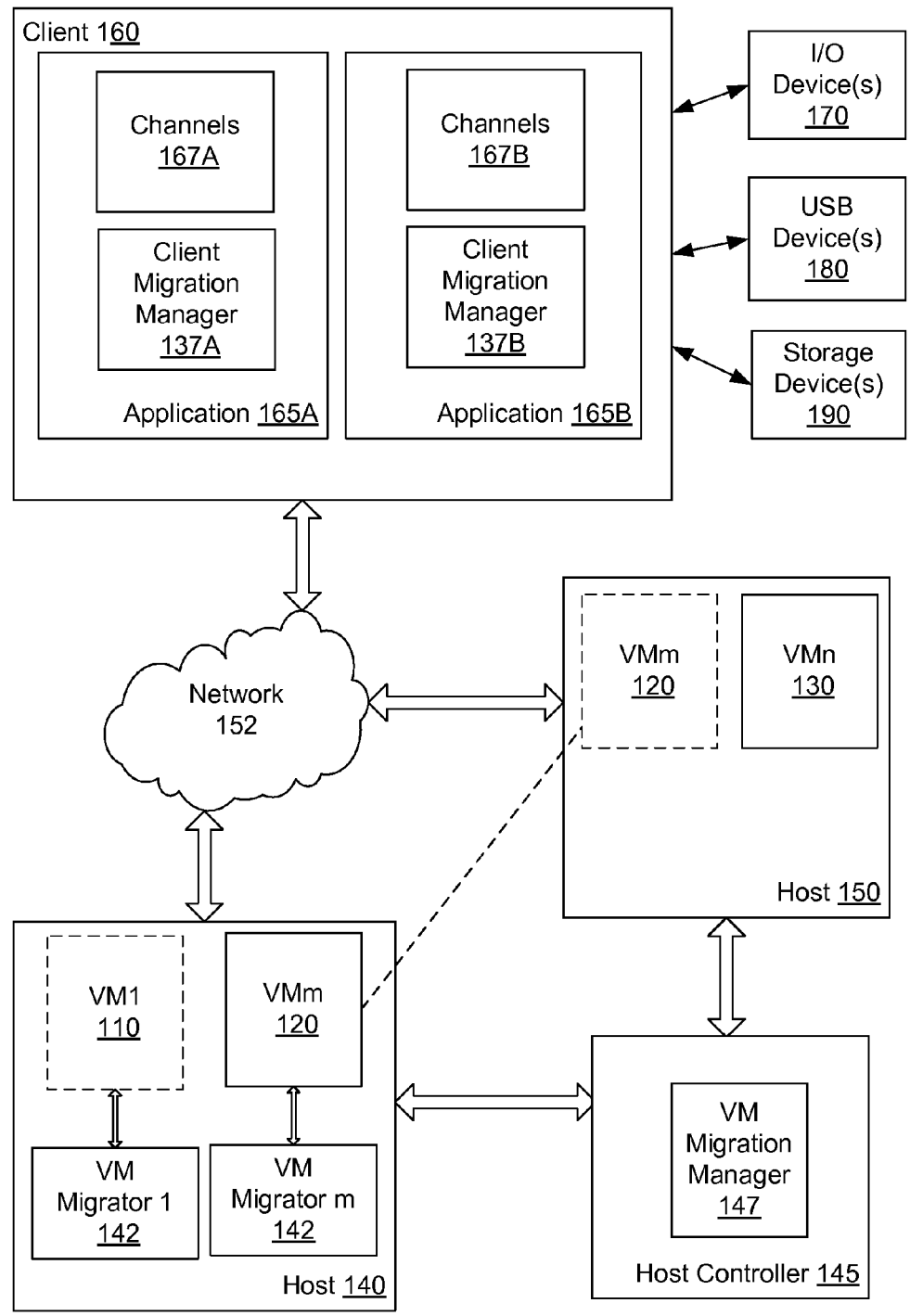
FIG. 1B is a block diagram of a virtualization system for live migration of client resources according to other embodiments of the invention.

FIG. 1B is a block diagram of a virtualization system 195 in which VMs and their associated client-side resources are live migrated according to alternative embodiments of the invention. Similar to system 100 of FIG. 1A, system 195 includes one or more clients 160 communicatively coupled to remote servers 140, 150 or a cluster of servers 140, 150 over a network 152. The servers 140, 150 are coupled to a host controller 145 (via a network or directly) that manages virtual machines hosted by servers 140, 150.

Each VM 110, 120 may communicate with one or more client applications 165A, 165B. Each client application 165A, 165B may have one or more client-side resources such as an I/O device 170, a USB device 180, or a storage device 190, etc. In one embodiment, VM 120 communicates with client application 165A using a multichannel protocol (e.g., RDP, SPICE™, etc.) that allows for connection between VM 120 and end-user devices of the client application 165A via individual channels 167A. In some embodiments, client-side resources also include a remote rendering agent and/or a remote connection protocol agent, and VM 120 may maintain connection with the remote rendering agent and/or the remote connection protocol agent via individual channels (some of channels 167A).

The host controller 145 may decide that VM 120 should be live migrated from a current host 140 to a new host 150 (e.g., upon a user request or an event such as load balancing on the host server, maintenance of the host server, upgrades of software and/or hardware of the host server, etc.). In the illustrated embodiment, the host controller 145 hosts a VM migration manager 147 that oversees a live migration process of the VMs in the system 195. In addition, a host 140, 150 may include a VM migrator 142 for each VM that participates in the migration of a corresponding VM. For example, the VM migrator 142 may exchange messages with the client 160 and other devices during migration and perform the actual migration of its VM. The VM migrator 142 may be part of the VMM or a hardware emulation layer, or an independent module running on top of the VMM.

The combination of the VM migrator 142 and the VM migration manager 147 provides functionality similar to that of the VM migration manager 135 discussed above in conjunction with FIG. 1B.

Figure 2:
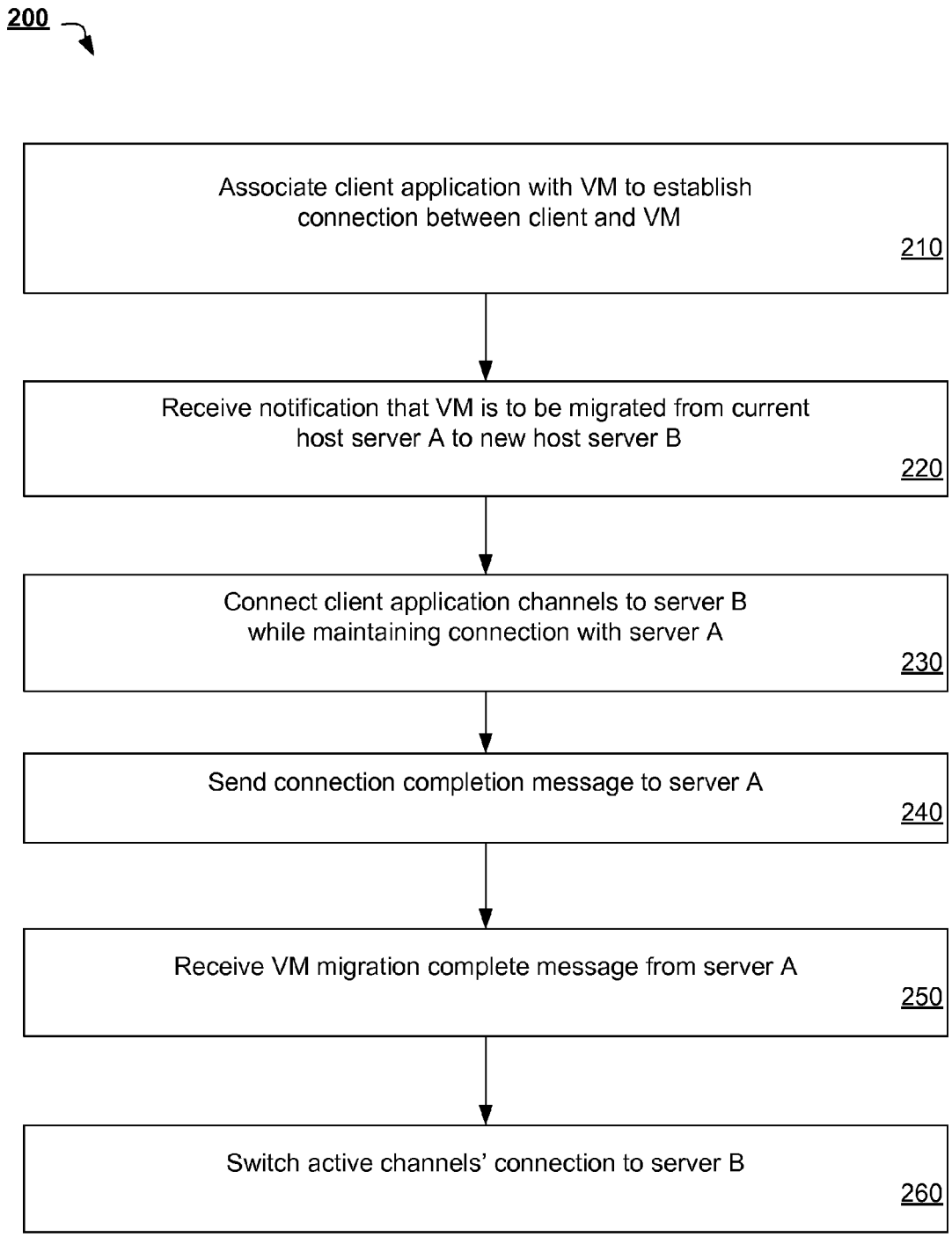
FIG. 2 is a flow diagram illustrating a client-side method for live migration of VM client resources according to embodiments of the invention.

FIG. 2 is a flow diagram illustrating a method 200 for live migration of VM client-side resources according to an embodiment of the invention. Method 200 may be performed by processing logic that may comprise hardware (e.g., circuitry, dedicated logic, programmable logic, microcode, etc.), software (such as instructions run on a processing device), or a combination thereof. In one embodiment, method 200 is performed by client migration manager 137A, 137B of FIG. 1A or FIG. 1B.

Method 200 begins at block 210 where client-side resources pertaining to a client application are associated with a VM via client application channels. This association enables the VM to access the client-side resources. In one embodiment, the client-side resources may include one or more of a remote rendering agent, a remote connection protocol agent, and/or end user devices, such as an input/output (I/O) device (e.g., a display, a keyboard, a mouse), a USB device, and a storage device, to name a few examples.

At block 220, notification is received that the VM is to be migrated from its current host server A to a new destination host server B. In one embodiment, this notification is sent from a VM migration manager of host server A overseeing the live migration process of the VM. Alternatively, the notification may be sent from a VM migration manager of a host controller or a VM migrator of host A.

Then, at block 230, the client application channels are connected to server B, in addition to their present connection to server A, during the live migration process of the VM. At this point, the client-side resources pertaining to the client application can be accessible for communication with both server A and server B, although server A is still utilized as the active connection for the client-side resources. A connection completion message for the client-side resource's connection to server B is sent to server A at block 240.

At block 250, a VM migration completion message is received from server A. This message indicates that the remote VM is now fully migrated from server A to server B. In some embodiments, the VM migration completion message may be sent from another server in the VM system and does not necessarily have to originate from the server involved in the migration process. Lastly, at block 260, the active channels' connection is switched from server A to server B. The above-described connection process during live migration is transparent to the VM service experienced at the client.

Figure 3:
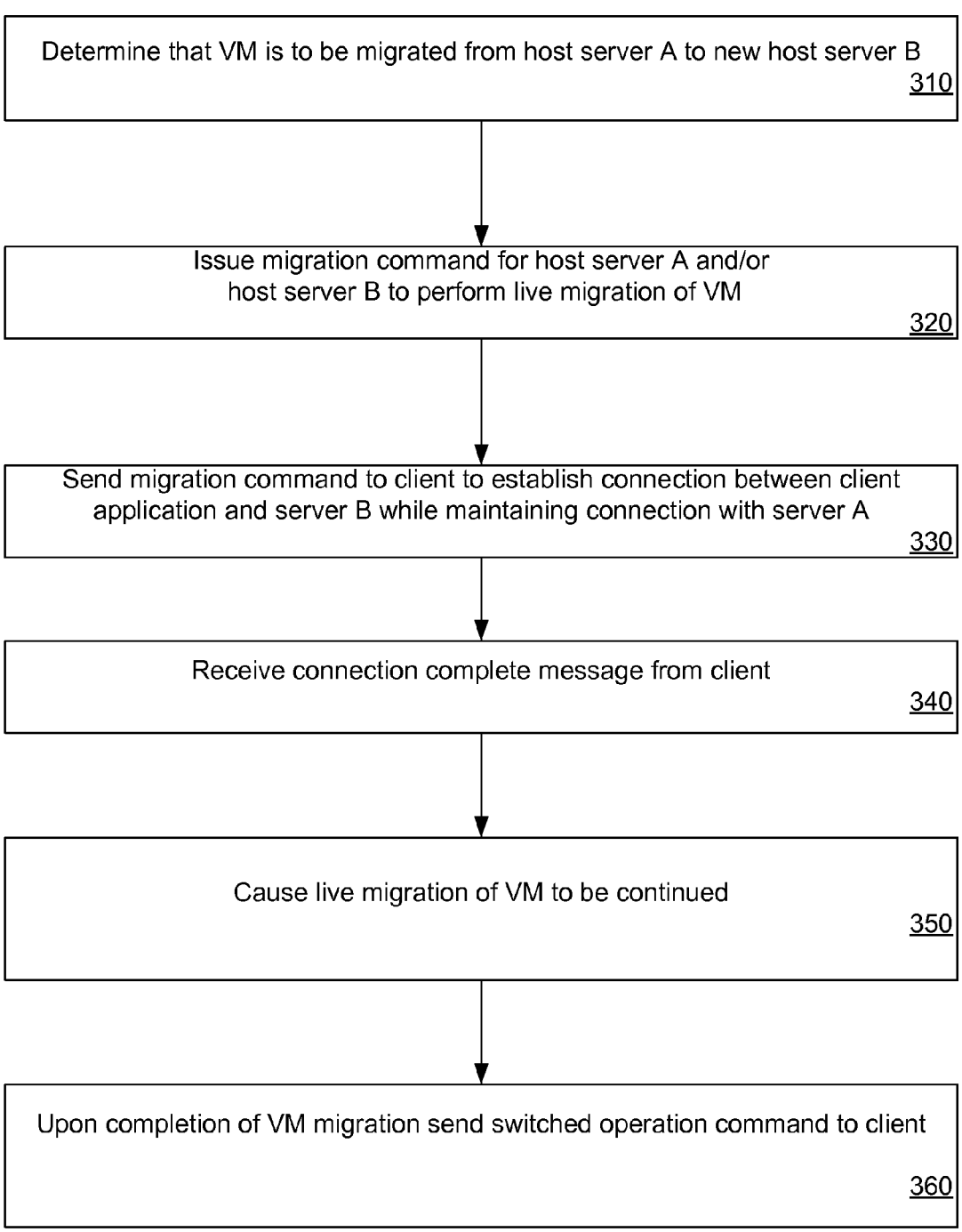
FIG. 3 is a flow diagram illustrating a server-side method for live migration of VM client resources according to embodiments of the invention.

FIG. 3 is a flow diagram illustrating another method 300 for live migration of VM client-side resources according to an embodiment of the invention. Method 300 may be performed by processing logic that may comprise hardware (e.g., circuitry, dedicated logic, programmable logic, microcode, etc.), software (such as instructions run on a processing device), or a combination thereof. Method 300 may be performed by VM migration manager 135 of FIG. 1A, VM migration manager 147 of FIG. 1B, or a combination of VM migration manager 147 and VM migrator 142 of FIG. 1B. Method 300 begins at block 310 where it is determined that a VM is to be migrated from its current host server A to a new destination host server B. In one embodiment, this live migration may be taking place for a variety of reasons, including, but not limited to, maintenance of the host server of a VM, upgrades to hardware and/or software of the host server of a VM, and load balancing of VMs between host servers to maximize performance levels. The determination can be made upon receiving a user (e.g., system administrator) request or upon detecting a predefined event (e.g., load balancing event).

At block 320, a migration command is issued for host server A, and possibly host server B, to perform live migration of the VM. Then, at block 330, a migration command is also sent to a client to instruct the client to migrate client-side resource connections for the VM from server A to server B. In one embodiment, the client-side resources may include one or more of a remote rendering agent, a remote connection protocol agent, and/or end user devices, such as an input/output (I/O) device (e.g., a display, a keyboard, a mouse), a USB device, and a storage device, to name a few examples. In one embodiment, the migration command may be sent to a client migration manager at the client. The migration command may specify the IP address and the port for the new destination, as well as some other information.

At block 340, a connection complete message is received from the client indicating that client-side resources at the client are now connected to server B. This connection is in addition to and simultaneous to a current connection between server A and the client-side resources. At block 350, the live migration of the VM is overseen. Upon successful completion of the VM live migration, at block 360, a switch operation command is sent to the client to instruct the client to switch the active channels connection from server A to server B. The above-described connection process for the client-side resource during live migration allows minimal interruption to the VM service experienced at the client.

It should be noted that the sequence of operations of methods 200 and 300 may be different from that illustrated in FIGS. 2 and 3. For example, the operations of block 330 and 340 can be executed before the operation of block 320, etc.

Figure 4:
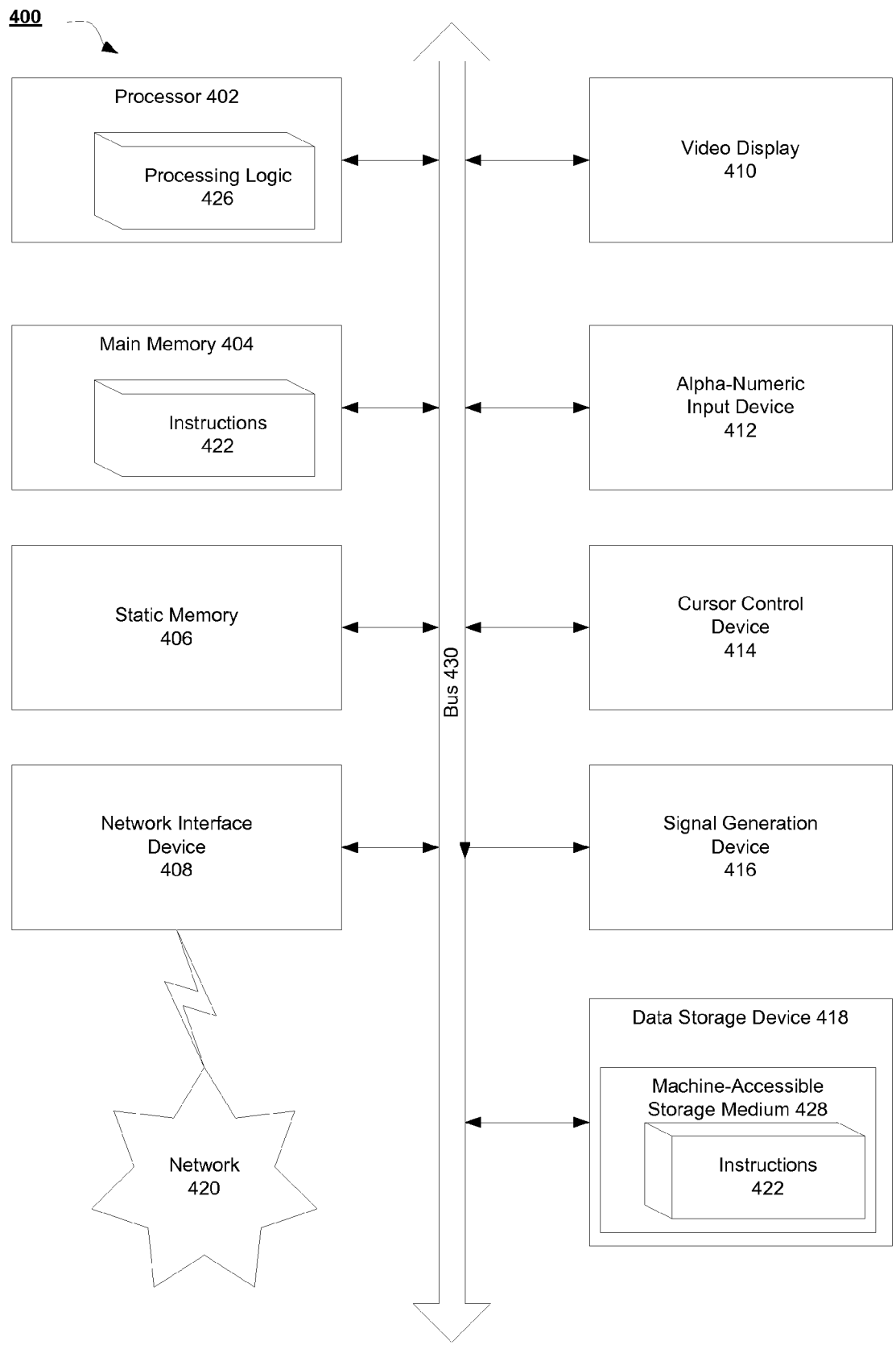
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to store instructions to perform live migration of client-side resources associated with a remote VM as described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
   receiving, at a client executing a client application, notification that a virtual machine (VM) is being live migrated from a first server to a second server;

connecting, by the client, one or more client resources associated with the VM to the second server over at least one channel according to a multichannel protocol during the live migration of the VM;

maintaining, during a live migration, a simultaneous active VM connection of the one or more client resources to the first server over at least one channel according to the multichannel protocol, the client resources pertaining to the client application and being associated with the VM to enable the VM to access the client resources;

upon completion of the live migration, receiving, at the client, a switch operation command; and in response to the switch command:
disconnecting the simultaneous active VM connection with the first server over the at least one channel; and
making the connection between the one or more client resources and the second server over the at least one channel an active connection.

2. The method of claim 1, further comprising sending a connection completion message to the first server of the connection of the one or more client resources to the second server.

3. The method of claim 1, further comprising receiving a VM migration completion message from any one of the first server, the second server and a host controller, prior to causing the active VM connection of the client resources to be disconnected from the first server.

4. The method of claim 1, wherein the one or more client resources include at least one of a remote rendering agent, a remote connection protocol agent, and one or more user devices.

5. The method of claim 4, wherein the one or more user devices include at least one of a display, a keyboard, a mouse, a USB device, and a storage device.

6. The method of claim 1, wherein the live migration of the remote VM includes moving the remote VM from the first server to the second server without shutting down the VM.

7. The method of claim 1, wherein the VM provides a virtual desktop for the client, and the channels are virtual desktop channels.

8. A system, comprising:
a memory;
a processing device coupled to the memory via a bus; and
a client migration manager operating from the memory to cause the processing device to:
receive notification that a virtual machine (VM) is being live migrated from a first server to a second server;
connect one or more client resources associated with the VM to the second server over at least one channel according to a multichannel protocol during the live migration of the VM;
maintain, during the live migration, a simultaneous active VM connection of the one or more client resources to the first server over at least one channel according to the multichannel protocol, the client resources pertaining to a client application and being associated with the VM to enable the VM to access the client resources;
receive, upon completion of the live migration, a switch operation command; and
in response to the switch command:
disconnect the simultaneous active VM connection with the first server over the at least one channel; and
make the connection between the one or more client resources and the second server over the at least one channel an active connection.

9. The system of claim 8, wherein the client migration manager operating further to send a connection completion message to the first server of the connection of the one or more client- side resources to the second server.

10. The system of claim 8, wherein the client migration manager operating further to receive a VM migration completion message prior to the the switch command.

11. The system of claim 8, wherein the one or more client resources include at least one of a remote rendering agent, a remote connection protocol agent, and one or more end user devices.

12. The system of claim 11, wherein the one or more end user devices include at least one of a display, a keyboard, a mouse, a USB device, and a storage device.

13. The system of claim 8, wherein the live migration of the VM includes moving the VM from the first server to the second server.

14. An article of manufacture comprising a non-transitory machine-readable storage medium including data that, when accessed by a machine, cause the machine to perform operations comprising:
receiving, at a client executing a client application, notification that a virtual machine (VM) is being live migrated from a first server to a second server;
connecting, by the client, one or more client resources associated with the VM to the second server over at least one channel according to a multichannel protocol during the live migration of the VM;
maintaining, during a live migration, a simultaneous active VM connection of the one or more client resources to the first server over at least one channel according to the multichannel protocol, the client resources pertaining to the client application and being associated with the VM to enable the VM to access the client resources;
upon completion of the live migration, receiving, at the client, a switch operation command; and
in response to the switch command:
disconnecting the simultaneous active VM connection with the first server over the at least one channel; and
making the connection between the one or more client resources and the second server over the at least one channel an active connection.

15. The article of manufacture of claim 14, wherein the machine-readable storage medium includes data, that when access by a machine, cause the machine to perform further operations comprising:
sending a connection completion message to the first server of the connection of the one or more client resources to the second server.

16. The article of manufacture of claim 14, wherein the one or more client resources include at least one of a remote rendering agent, a remote connection protocol agent, and one ore more end user devices.

17. The article of manufacture of claim 16, wherein the end user devices include at least one of a display, a keyboard, a mouse, a USB device, and a storage device.

* * * * *